US011611527B1

(12) United States Patent
Oliveira et al.

(10) Patent No.: US 11,611,527 B1
(45) Date of Patent: Mar. 21, 2023

(54) SYSTEMS AND METHODS FOR MULTIPLE CHANNEL MESSAGE HANDLING AND ROUTING

(71) Applicant: State Farm Mutual Automobile Insurance Company, Bloomington, IL (US)

(72) Inventors: Andrew Oliveira, Tucker, GA (US); Wen Ding, Duluth, GA (US); Benjamin E. Byrd, Avondale Estates, GA (US); Holly Lambert, Roswell, GA (US); John Martinez, McDonough, GA (US); Jonathan Chang, Brooklyn, NY (US); Jose G. Aranguren, Atlanta, GA (US); Maurice Pruna, Roswell, GA (US); Shagun Kariwala, Alpharetta, GA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 17/522,671

(22) Filed: Nov. 9, 2021

(51) Int. Cl.
G06F 15/16 (2006.01)
H04L 51/56 (2022.01)
H04L 51/214 (2022.01)

(52) U.S. Cl.
CPC ............ *H04L 51/56* (2022.05); *H04L 51/214* (2022.05)

(58) Field of Classification Search
CPC .............................. H04L 51/56; H04L 51/214
USPC ....................................................... 709/206
See application file for complete search history.

(56) References Cited

U.S. PATENT DOCUMENTS

| | | | |
|---|---|---|---|
| 6,182,118 B1 | 1/2001 | Finney et al. | |
| 6,622,160 B1 | 9/2003 | Horvitz | |
| 8,019,834 B2 | 9/2011 | Horvitz et al. | |
| 8,593,953 B2* | 11/2013 | Marbach | H04W 28/02 370/252 |
| 8,880,627 B2* | 11/2014 | Davenport | H04L 51/56 709/204 |
| 9,560,001 B1* | 1/2017 | Collins | H04L 51/52 |
| 9,998,944 B2 | 6/2018 | Wang et al. | |
| 10,225,132 B2* | 3/2019 | Yang | H04L 41/0213 |
| 10,447,635 B2 | 10/2019 | Sathi et al. | |
| 11,329,933 B1* | 5/2022 | Kiyanda | H04L 51/56 |
| 2003/0036384 A1 | 2/2003 | Chen et al. | |
| 2004/0010651 A1 | 1/2004 | Wiegert | |
| 2014/0148191 A1* | 5/2014 | Feng | H04W 72/1215 455/454 |
| 2015/0312838 A1* | 10/2015 | Torres | H04L 65/1069 370/329 |
| 2017/0374179 A1* | 12/2017 | Das | H04L 67/01 |
| 2018/0025360 A1* | 1/2018 | Gorny | G06Q 30/01 707/748 |

(Continued)

*Primary Examiner* — Alicia Baturay
(74) *Attorney, Agent, or Firm* — Armstrong Teasdale LLP

(57) ABSTRACT

A system and method for intelligent message routing is provided. The system and method include a) storing, in one or more storage devices, a plurality of transmission rules for transmitting messages, b) receiving a message to be transmitted to a participant, c) comparing the message to the plurality of transmission rules, d) determining a first channel to transmit the message to a computer device associated with the participant based on the comparison, e) converting the message into a first message for transmission on the first channel, and f) transmitting the first message over the first channel.

20 Claims, 10 Drawing Sheets

(56) References Cited

U.S. PATENT DOCUMENTS

2019/0187690 A1  6/2019  Cella et al.
2019/0379557 A1* 12/2019  Mahzari ................. H04L 67/55

* cited by examiner

SYSTEMS AND METHODS FOR MULTIPLE CHANNEL MESSAGE HANDLING AND ROUTING

BACKGROUND OF THE DISCLOSURE

The field of the disclosure relates generally to advanced message handling systems, and more specifically, to systems and methods for managing message handling through multiple channels.

Routing messages to users via multiple available channels can be expensive, in time and effort, to set-up and maintain. Furthermore, different users may have easier access and respond more readily to different messaging types or communication channels. In many systems, it is difficult to integrate new messages into existing messaging systems. In addition, important communications can become lost due to the amount of time between messages and being overshadowed by later messages. Sometimes a response to a first message is lost because a second message is transmitted over the same channel before the first response is received. Accordingly, it would be desirable to have a messaging system that can handle communications with users via a multitude of channels.

BRIEF DESCRIPTION OF THE DISCLOSURE

The present embodiments may relate to systems and methods for intelligent message routing. The system may include an intelligent message routing computing device, (such as an intelligent message router), one or more client devices, one or more third party servers, and/or one or more databases.

In at least one embodiment, a system for intelligent message routing is provided. The system may include one or more processors, one or more computer readable storage devices, and a plurality of program instructions stored on at least one of the one or more storage devices for execution by at least one of the one or more processors. When executed by the one or more processors, the plurality of program instructions cause the one or more processors to a) store a plurality of transmission rules for transmitting messages, b) receive a message to be transmitted to a participant, c) compare the message to the plurality of transmission rules, d) determine a first channel to transmit the message to a computer device associated with the participant based on the comparison, e) convert the message into a first message for transmission on the first channel, and f) transmit the first message over the first channel. The system may include additional, less, or alternate functionality, including that discussed elsewhere herein.

In another embodiment, a computer implemented method for intelligent message routing is provided. The method may include a) storing, in one or more storage devices, a plurality of transmission rules for transmitting messages, b) receiving a message to be transmitted to a participant, c) comparing the message to the plurality of transmission rules, d) determining a first channel to transmit the message to a computer device associated with the participant based on the comparison, e) converting the message into a first message for transmission on the first channel, and f) transmitting the first message over the first channel. The method may include additional, less, or alternate actions, including those discussed elsewhere herein.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
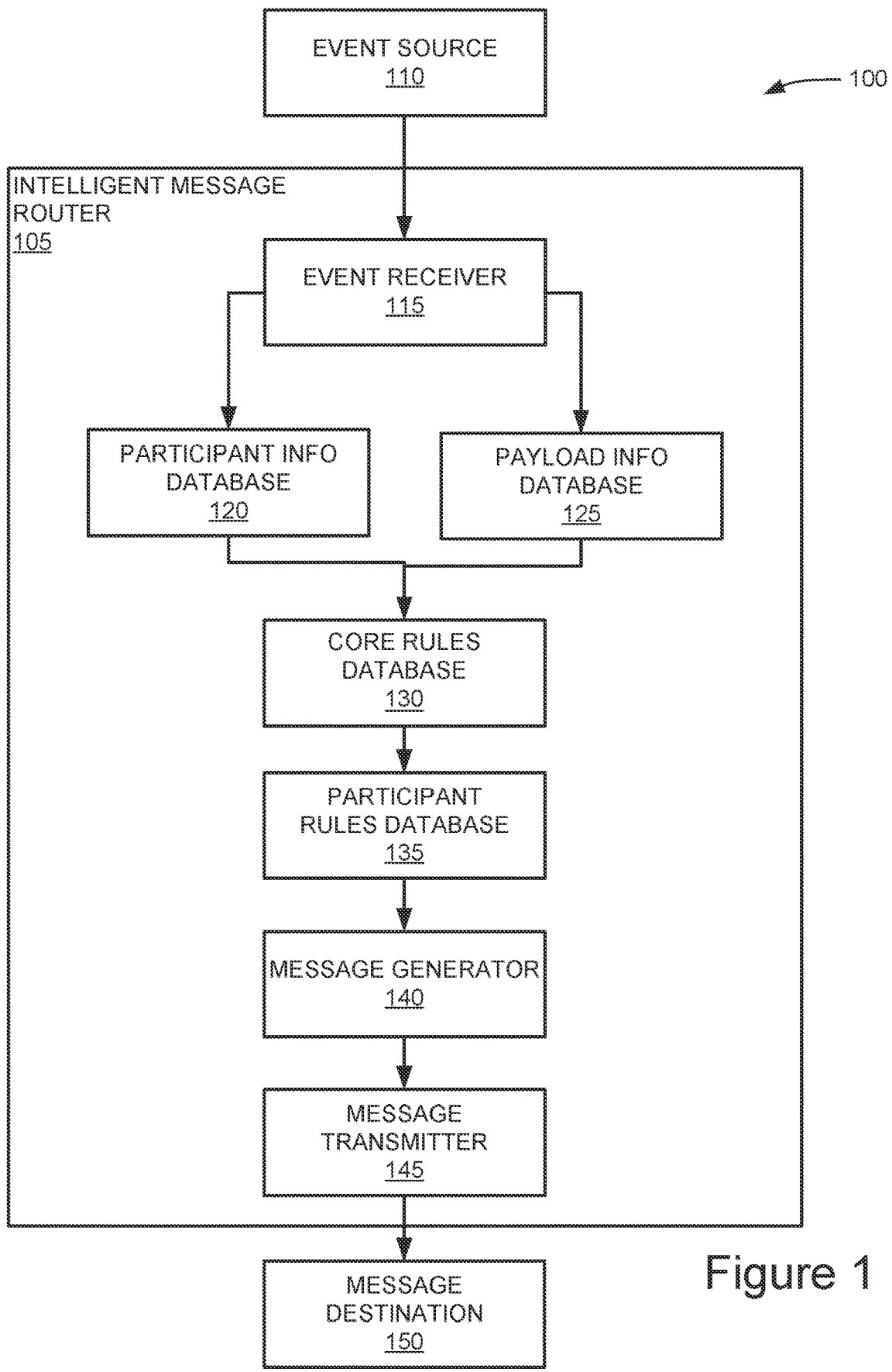
FIG. 1 illustrates a block diagram of an intelligent message routing system in accordance with at least one embodiment.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DISCLOSURE

The present embodiments may relate to, inter alia, systems and methods for intelligent message routing. In an exemplary embodiment, the process is performed by an intelligent message router. In some other embodiments, an intelligent message routing application may be executed by a computer device and/or server. The intelligent message router manages communication with a plurality of external participants. The intelligent message router manages the communication channels with each participant. The intelligent message router compares the message to base rules and participant specific rules to determine if the message should be transmitted, which channel to use for the message, and what to include in the message. In some embodiments, a message may be transmitted over multiple different channels.

The intelligent message router also manages conversations, where each conversation is a series of exchanges of messages. For the purposes of this discussion conversations occur on the same channel. For example, in a first conversation a first message to a participant on a first channel is followed by a response from the participant on that same channel. Follow-up messages would be also transmitted on the same channel.

To prevent the conversation from being interrupted by a message that is not a part of the conversation, the intelligent message router locks the channel that the conversation is occurring on, so that other messages, not associated with the conversation, would not be sent to the participant on that channel until the conversation in complete. The intelligent message router may route subsequent messages associated with different conversations to other channels. The intelligent message router may also delay those messages until an appropriate channel is available. For example, the intelligent message router may store the message in a memory device. In another example, the intelligent message router routes the messages to a message handler, which will resubmit the messages for transmission after a period of time. If a channel is available, then the message will be transmitted. If no channel is available, the message may be rerouted to the message handler for another period of delay.

When the intelligent message router locks a channel for a conversation, the channel is only being locked for a specific participant and/or endpoint. For example, the channel could be locked for a first participant, but a different participant might not be locked and then be able to receive messages over that channel. Furthermore, the first participant can still receive messages over unlocked channels. For example, the first channel may be locked, which is for text messages, while a second channel, which is for chat messages through an app, may be open and unlocked. In addition, if the participant had multiple endpoints that can use the same channel, the channel lock is only for a single endpoint. For example, if the participant had two mobile phones, one for work and one for person, the text message channel of the home phone may be locked, but the text message channel of the work phone could be open.

Exemplary Intelligent Message Handling System

FIG. 1 illustrates a block diagram of an Intelligent Message Routing System 100 in accordance with at least one embodiment. In the exemplary embodiment, the intelligent message routing system 100 is configured to transmit messages to individual participants and/or groups of participants 260 (shown in FIG. 2) based on a plurality of rules and user preferences. In some embodiments, the intelligent message routing system 100 is associated with a business that needs to communicate with its customers, such as by providing information to and requesting information from their customers. In other embodiments, the intelligent message routing system 100 is associated with an emergency notification system, where the messages are sent to the individuals to warn them of potentially hazardous conditions. In still other embodiments, the intelligent message routing systems 100 is associated with a game or other message and response activity, where the system 100 is engaging with the individual participant 260. In the exemplary embodiment, a participant 260 has registered to receive messages from the intelligent message routing system 100.

In the exemplary embodiment, the intelligent message routing system 100 includes an intelligent message router 105. The intelligent message router 105 is configured to receive event information from an external event source 110. The event source 110 can be a computer device, such as a server. In some embodiments, there are multiple event sources 110 in communication with the intelligent message router 105. The event source 110 transmits information about an event to the intelligent message router 105, which receives the event information via an event receiver 115. The event could include, but is not limited to, a request for information, an emergency notification, a payment being due, a payment method being declined, a life event occurring, an item going on sale, a new coupon being available, a policy change, a data breach notification, and/or any other event that necessitates communication with an individual. In the exemplary embodiment, the event source 110 is associated with a business or service that the participant 260 has registered for.

Event information could include, but is not limited to, participant identifier, message type, event type, priority, and/or other information as described herein. The event receiver 115 receives the event information. The intelligent message router 105 uses the event information to access a participant information database 120 and a payload information database 125. In the exemplary embodiment, the participant information database 120 includes information about participants 260 where the information is unique to that person. The information can include, but is not limited to, personal information (such as name, age, pronouns, etc.), contact information (such as phone number, messaging account number), contact preferences (preferred communication channels), services subscribed to (such as emergency notifications, sales notifications), and other information about the participants 260. The payload information database 125 includes information for the payload of the messages. More specifically, the event information can identify the message and participant 260 that the message is directed to. The information about that participant 260 is retrieved from the participant information database 120, while the payload for the message is retrieved from the payload information database 125. This reduces the amount of messages and size of messages for communicating the event information, since the payload doesn't need to be transmitted through the event receiver 115 multiple times, or even once. Only the payload identifier is needed.

Since different messages will include different information and the same message can be sent to multiple, different participants 260, which will include mostly the same information going to multiple participants 260, it can be more efficient to store the message payload information in the payload information database 125 and access the database 125 to retrieve the information rather than transmit all of the payload information with the event information. In these embodiments, the event information includes identifying information for the message type and/or payload type needed for the message. This reduces the bandwidth needed for communication between the event source 110 and the event receiver 115.

With the participant information and the payload information retrieved, the intelligent message router 105 accesses a core rules database 130. The core rules database 130 includes rules about whether or not different messages can be sent to different participants 260. For example, one of the rules may be that certain types of messages cannot be transmitted to minors. Other examples of core rules include, but are not limited to, is the participant 260 legally allowed to be contacted, is the participant 260 a specific type of customer, is the customer located someplace with anti-spam legislation, etc. From the event information and/or the payload information database 125, the message type can be determined. From the participant information database 120, the participant's age can be retrieved and compared to the rules to determine if this message can be transmitted to this participant 260. If not, then the intelligent message router 105 can respond with a message failed response to the event source 110, to a log, to a third-party device, and/or to the delivery status event publisher 245 (shown in FIG. 2).

The intelligent message router 105 also accesses a participant rules database 135. The participant rules database 135 includes rules and/or preferences specific to the individual participant 260. Some of the rules and/or preferences are set by the participant 260. Some of the rules and/or preferences may be based on observations of previous interactions with the participant 260. For example, the participant rules and/or preferences can include, but are not limited to, preferred contact channel (SMS messages preferred to messages transmitted through an app), preferred contact times (after work), contact frequency, and/or other preferences. The intelligent message router 105 compares the message type and information to the participant rules and/or preferences to determine how and if the message is to be transmitted to the participant 260. In some embodiments, the intelligent message router 105 delays the transmission of the message to an appropriate time. For example, the intelligent message router 105 may determine that the participant 260 only wants to be contacted outside of first shift business hours. The intelligent message router 105 can delay transmission of the message until the appropriate time. In another example, the intelligent message router 105 may determine that the participant 260 only wants to be contacted 2 times a week. The intelligent message router 105 may then determine that the participant 260 has already been contacted twice this week. The intelligent message router 105 then determines whether the message is to be saved for later or dropped completely.

If the intelligent message router 105 determines that the message is to be transmitted, a message generator 140 generates the message for transmission. The message generator 140 receives the participant information, participant preferred message channel, the message type, and the payload information. Then the message generator 140 generates the message for transmission on the desired message channel. For example, the message could include, but it not limited to, a text message, an SMS message, a push message through an app, a chat message, a website based chat message, a push message for a specific type of phone, a message on a messaging application, an automated phone call, an email, a direct message, and/or any other type of message. In some embodiments, the message generator 140 uses a template to generate the messages, where the message generator 140 has access to a plurality of templates, such as those for a plurality of different channels and a plurality of different message types.

When the message has been generated, the message transmitter 145 transmits the message to the message destination 150. In the exemplary embodiment, the message destination 150 is a computer device or application associated with the participant 260, such as a smart phone. In some embodiments, the intelligent message router 105 stores the completed message until it is time to transmit the message, such as when the message is to be transmitted between specific hours or the message is to be delayed until a timer has expired.

In some embodiments, the participant information database 120, the payload information database 125, the core rules database 130, and the participant rules database 135 could all be stored in the same database. In other embodiments, one or more of the above databases are stored separately from the other databases. In still further embodiments, the databases may be distributed databases. In the exemplary embodiment, the databases may be stored remotely from the intelligent message router 105. In some embodiments, databases may be decentralized. In the exemplary embodiment, a user may access one or more of the databases via a user computer device by logging onto the intelligent message router 105, as described herein.

In some embodiments, the message transmitter 145 is a transceiver and monitors for a reply from the participant 260.

Exemplary Two-Way Message Handling

Figure 2:
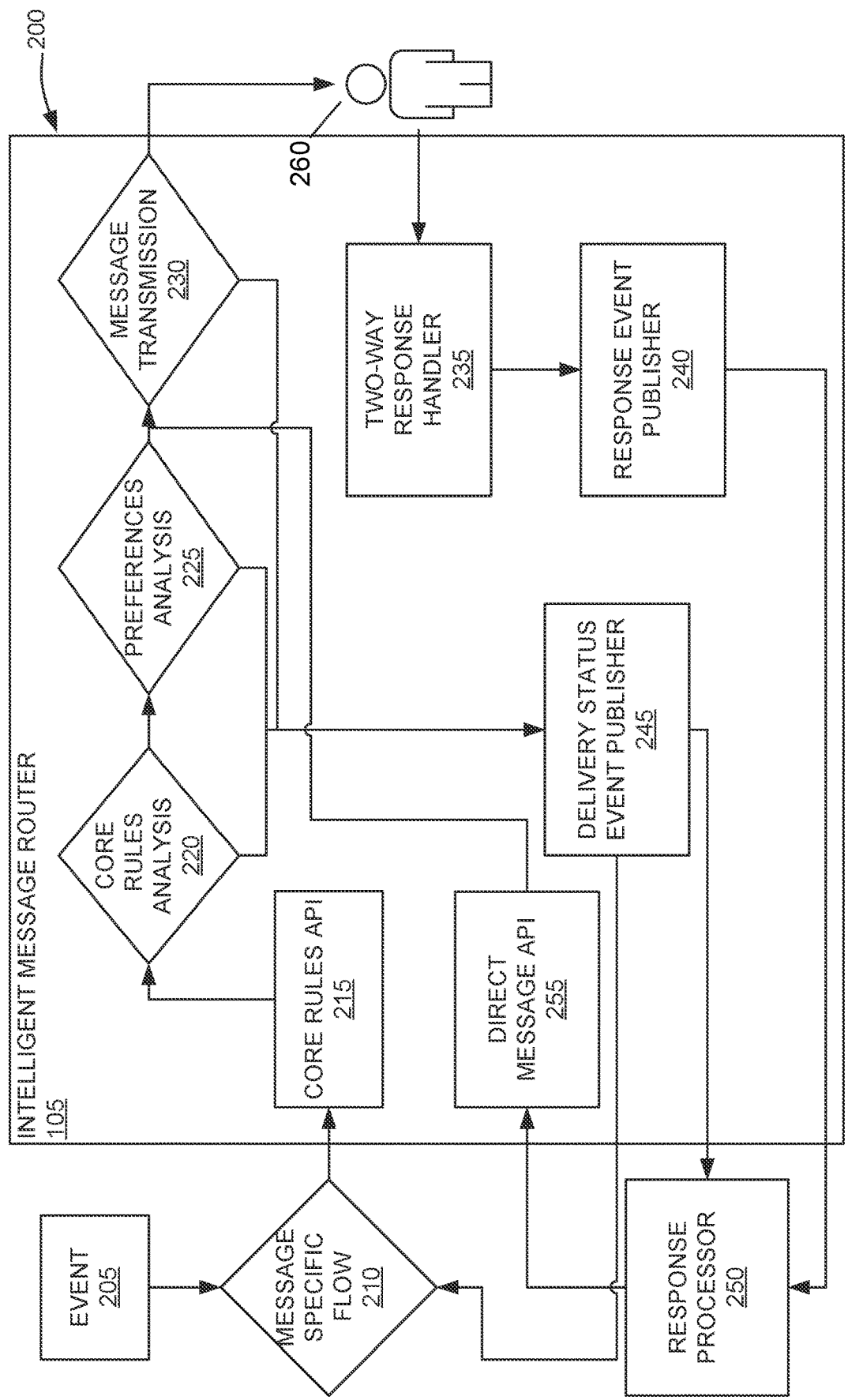
FIG. 2 illustrates a flow chart of process for two-way message handling using the system shown in FIG. 1.

FIG. 2 illustrates a flow chart of process 200 for two-way message handling using the system 100 (shown in FIG. 1). In the exemplary embodiment, process 200 is performed by the intelligent message router 105 (shown in FIG. 1).

In the exemplary embodiment, an event 205 occurs and is published. The event 205 is routed to the event receiver 115 (shown in FIG. 1) of the intelligent message router 105. The specific message flow for the message is determined 210, including message type and payload information from the payload information database 125 (shown in FIG. 1).

In the exemplary embodiment, the general messaging qualifications are evaluated, such as can this message be transmitted to the desired participant 260. A core rules API (advanced programming interface) 215 accesses information from the core rules database 130 (shown in FIG. 1). A core rules analysis module 220 analyzes the message in view of the retrieved information from the core rules. The core rules analysis module 220 determines if the message can be transmitted. If the message is determined not to be transmitted, the core rules analysis module 220 reports to a delivery status event publisher 245. In some embodiments, the core rules analysis module 220 reports to the delivery status event publisher 245 if the message is a failure. In some further embodiments, the core rules analysis module 220 reports one or more reasons for the failure. In still further embodiments, the core rules analysis module 220 reports if the message is approved in view of the core rules.

The participant communication preferences are identified and filtered. A preferences analysis module 225 evaluates the message in view of the participant rules and/or preferences in the participant rules database 135 (shown in FIG. 1). The preferences analysis module 225 may determine which channel to transmit the message on and may filter out parts of the message based on the participant rules and/or preferences. Furthermore, the preferences analysis module 225 may also determine whether or not to transmit the message based on the participant rules and/or preferences. If the preferences analysis module 225 determines not to transmit the message, then the preferences analysis module 225 reports to the delivery status event publisher 245 that the message was a failure. In some further embodiments, the preferences analysis module 225 reports one or more reasons for the failure.

If the message is approved by both the core rules analysis module 220 and the preferences analysis module 225, then the message transmission module 230 ensures that the message details are compiled, such as by the message generator 140 (shown in FIG. 1). The message transmission module 230 instructs the message transmitter 145 (shown in FIG. 1) to transmit the message on the preferred channel to the message destination 150 (shown in FIG. 1), such as a computer device of the participant 260. If the message fails to be transmitted or returned as failed to be delivered, the message transmission module 230 reports the failure of the message delivery to the delivery status event publisher 245. If the message is successfully received by the message destination 150, then the message transmission module 230 reports the success to the delivery status event publisher 245.

The participant 260 then responds to the message through their computer device. A two-way response handler 235 receives the message. In some embodiments, the two-way response handler 235 is a part of or associated with the message transmitter 145. The participant response is processed by the two-way response handler 235 for keywords, intent, and context. In some embodiments, the participant response is in natural language, which needs to be parsed. In further embodiments, the participant response is a number, a name, or a different work or phrase. For example, if the message includes a list of repair shops, where each is associated with a number, the participant 260 is supposed to respond with a number indicating the repair shop that they chose. However, the participant 260 may respond with the name of the repair shop rather than the number, and the two-way response handler 235 will parse the response information to determine the actual response from the participant 260.

The keywords, intent, and context are forwarded to a response event publisher 240. The response event publisher 240 creates a response event to indicate that a response was sent by the participant 260. The response event publisher 240 notifies an appropriate response processor 250, such as the event source 110 (shown in FIG. 1) that a response was received from the participant 260. The notification also includes details on the outbound message context, the channel the participant 260 communicated on and keywords identifies in the participant's response.

A response processor 250 receives the response information from the response event publisher 240. In some embodiments, the response processor 250 also receives the success or failure information about the message from the delivery status event publisher 245. The response processor 250 determines or identifies a follow-up response in reply to the participant's response. The response processor 250 uses a direct message API 255 to publish this response directly to the "open" channel with the participant 260. In these embodiments, the message is forwarded to the message transmission module 230 to be transmitted to the message destination 150 using the same channel as the original message. In some embodiments, the direct message API 255 may check one or more participant preferences prior to passing the message to message transmission 230. For example, if the participant has a preference to not send any messages after 10 PM and the first message was sent at 9:30 PM, the direct message API 255 may check the time to ensure that it is sending a message before the cut-off time. In another example, if the participant 260 has opted-out of the conversation or communications on this channel, the direct message API 255 may check this preference to determine if the message may still be transmitted to the participant 260.

In some embodiments, a conversation identifier is associated with the back and forth messages from the intelligent message router 105. This conversation identifier is in addition to any message identifier associated with the message. For example, the first message may be associated with conversation 123 which is requesting payment information from the participant 260. The first message may also have a message identifier 1A. When the participant 260 responds, the intelligent message router 105 may assign the response message with a message identifier 2B. The intelligent message router 105 and/or the two-way response handler 235 determine that message 2B was in response to message 1A and therefore the response message 2B is assigned to conversation 123. When another message is sent to the participant 260 over the same channel, that message could also assigned to conversation 123. If the new message is a part of the same conversation, then that message could be assigned to conversation 123. If the new message is a part of different, new conversation, then that message could be assigned to a different conversation identifier. In some further embodiments, each message and response combination are assigned to a different conversation identifier, such that a first message and response are assigned a first conversation identifier and a second conversation and response are assign to a second conversation identifier.

In some further embodiments, the conversations are based on the messaging channel used. For example, a participant 260 could be participating in conversation 123 on channel A and conversation 321 on channel B. Therefore, the intelligent message router 105 knows to assign messages on channel A to conversation 123 and message on channel B to conversation 321. In still further embodiments, some conversations may reach an endpoint or conclusion. In these embodiments, the intelligent message router 105 may receive a notification, such as from the response processor 250 that the conversation 123 is complete. Therefore, future messages on channel A 320 may be assigned to a different conversation.

In additional embodiments, the intelligent message router 105 tracks both session identifiers and conversation identifiers. In these embodiments, a session identifier refers to the overall interactions between the participant 260 and the response processor 250 and may contain multiple conversations. For example, the remote processor 250 is associated with a travel agency and the participant 260 and remote processor 250 are discussing a trip that the participant 260 is taking. First, they discuss the plane flights. This first exchange includes multiple messages and responses and is associated with a first conversation identifier. Then they discuss the hotel stay. This second exchange also includes multiple messages and response and is associated with at second conversation identifier. A third conversation of multiple messages and response is a discussion of car rentals and is associated with a third conversation identifier. Then entire discussion, with three conversations, is associated with a single session identifier. At a later time, if the participant 260 contacts the travel agent or another person associated with the travel agent about the car rental, then the third conversation identifier can be used to retrieve all of the messages associated with the third conversation. This can be useful at a call center, where a different individual may be conversing with the participant 260. The individual can review the car rental conversation to know what was previously discussed, thereby reducing the amount that the participant 260 will have to repeat themselves about the previous conversation. In some further embodiments, a session identifier may be based on one or more of the participant identifier, the endpoint identifier, and the date. In some embodiments, the session identifier may be used where the conversation was started by the participant 260. In these embodiments, the intelligent message router 105 may go back and assign a conversation identifier and/or session identifier to the messages including the starting message from the participant 260

In still further embodiments, the intelligent message router 105 determines that a response message is associated with a conversation based on the amount of time between the message and the response. The amount of time may be a few minutes, to few hours, to over a week depending on the conversation. The intelligent message router 105 determines that if the participant 260 has not responded by the predetermined amount of time, the conversation has ended. The intelligent message router 105 may also determine that the conversation has ended if no follow-up message is sent to the participant 260 within a predetermined period of time.

In the exemplary embodiment, the messages in a conversation are stored in a memory device, such as in a database. This allows users to review the conversations. For example, a call center worker may review the conversations prior to speaking with the participant 260 to prevent having to repeat questions that the participant 260 has answered previously in the conversation.

In these embodiments, the intelligent message router 105 knows that channel A is currently assigned to conversation 123. When the intelligent message router 105 receives a message to transmit to the same participant 260, but the message is associated with a different conversation, the intelligent message router 105 can transmit the message on a different channel, such as channel B. In this manner messages are not mixed up or assigned to the wrong conversation. For example, if the second message was for a different conversation, but was transmitted on channel A, the intelligent message router 105 may have difficulty determining which conversation to assign any response messages to.

In still further embodiments, the intelligent message router 105 may reassign a channel to a new conversation if a predetermined period of time has passed since the last message was transmitted in the previous conversation. This would reopen the channel to future conversations as the previous conversation is considered finished or discontinued.

In additional embodiments, the intelligent message router 105 may determine one or two additional participant preferences based on the participant's responses to the messages. By reviewing the response with the two-way response handler 235 and/or the response event publisher 240, the intelligent message router 105 may determine feedback based on the message and message channel used. For example, the intelligent message router 105 determines that the user responds to app-based push messages after several days, but usually responds to SMS messages within one to two hours, the intelligent message router 105 may change the participant's preferences so that SMS messages are a higher priority channel than app-based push messages. In another response, the participant 260 may say "Call me Bill" or have their preferred pronouns in a response. The intelligent message router 105 can update the participant preferences to change the participant's preferred name and pronouns for being addressed. In a further embodiment, the intelligent message router 105 may include or be in communication with one or more machine learning systems. The machine learning systems may allow the intelligent message router 105 to determine one or more other preferences for the participant 260. For example, the participant 260 may use emojis in their responses. The machine learning systems may then update the participant preferences to include that messages to the participant 260 should include appropriate emojis.

In at least one embodiment, the messages and responses are being transmitted over an audio channel, such as an automated phone call. The two-way response handler 235 is able to parse the participant's audible responses to provide the needed information to the response processor 250. The response processor 250 then generates audible follow-up messages.

In at least one embodiment, the message handler 315 may transmit the same message over multiple channels. In this embodiment, the message generator 140 may generate two version of the message, one for channel A 320 and one for channel B 325. Then the message transmitter 145 transmits the appropriate message on each channel A 320 and B 325.

Additional Exemplary Two-Way Message Handling

Figure 3:
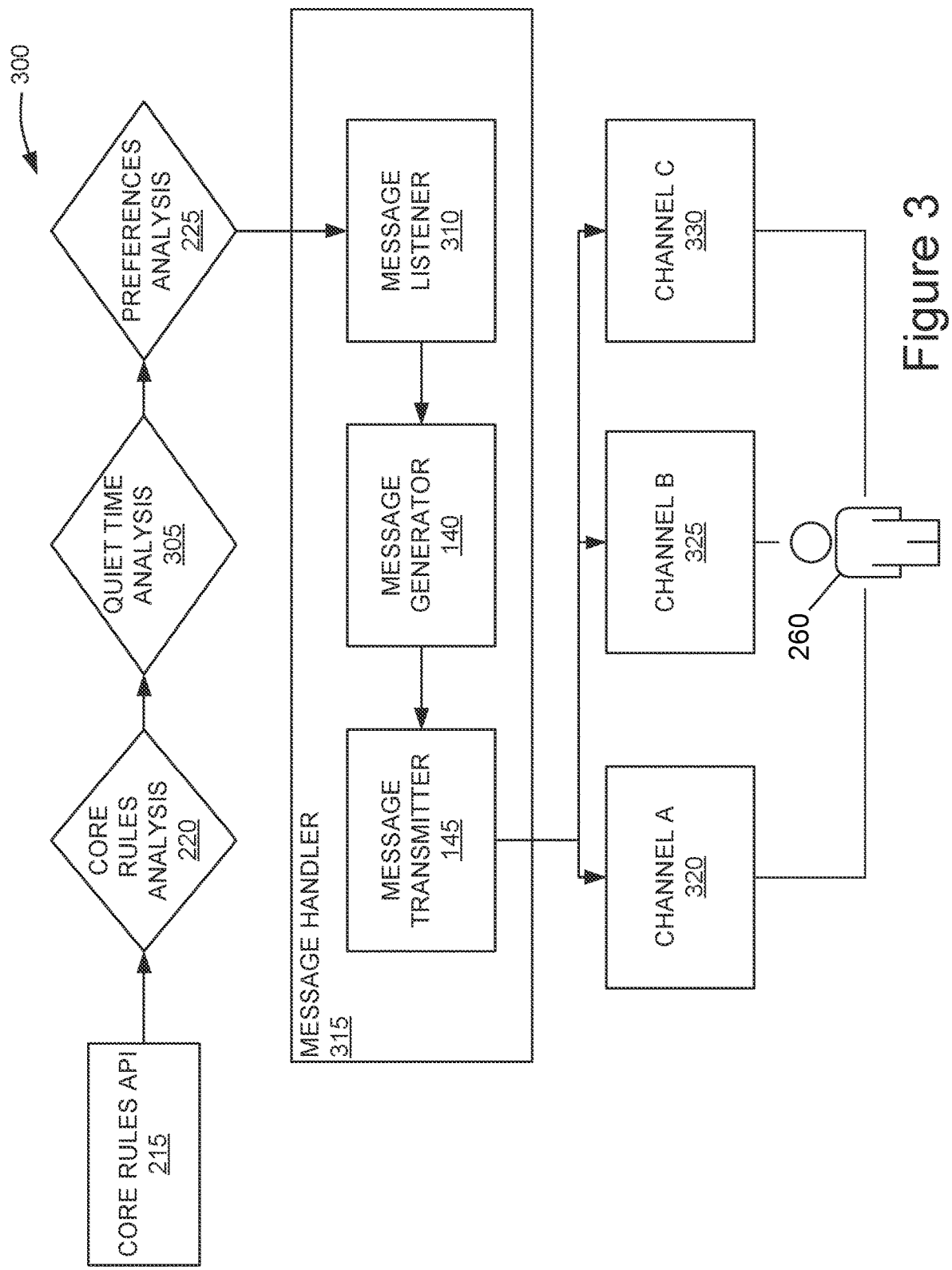
FIG. 3 illustrates a flow chart of an alternative process for two-way message handling using the system shown in FIG. 1.

FIG. 3 illustrates a flow chart of an alternative process 300 for two-way message handling using the system 100 (shown in FIG. 1). In the exemplary embodiment, process 300 is performed by the intelligent message router 105 (shown in FIG. 1).

In process 300, an additional analysis module 305 is added between the core rules analysis module 220 and the preferences analysis module 225. The additional module is a quiet time analysis module 305. The quiet time analysis module 305 determines whether or not the message can be transmitted to the participant 260 based on the time of day. Quiet time refers to when the participant 260 is potentially asleep or otherwise not interested in receiving messages. The quiet time analysis module 305 determines the current time for the participant 260 and then determines whether or not the participant 260 should receive the message based on the current time. For example, an event 205 (shown in FIG. 2) may come from a first time zone (Eastern), while the participant 260 is in a different time zone (Pacific). While 10AM may be an acceptable time to transmit a message, 7 AM may be considered quiet time. In some embodiments, the quiet time analysis module 305 determines the participant's location from the participant information database 120 (shown in FIG. 1). In other embodiments, the quiet time analysis module 305 may know the participant's location from the location of their associated computer device. For example, the computer device may include an application that provides location information to the system 100.

In some embodiments, if the participant 260 is currently in a quiet time, then the intelligent message router 105 (shown in FIG. 1) holds the message until a period of time after the participant 260 is no longer in the quiet time period. In other embodiments, the quiet time analysis module 305 checks the message type before determining whether or not the participant 260 is in quiet time. For example, some message types, such as emergency messages are transmitted whether or not the participant 260 is within quiet time. In other message types, the different message types may have different quiet times. For example, messages with coupons for coffee may only be sent out in specific periods of day. In still further embodiments, the quiet time analysis module 305 also handle a message that is designed to go out right before dinnertime, such as a coupon for a restaurant. Furthermore, quiet time analysis module 305 may also determine that certain channels can be used only at certain times. For example, while an email may be transmitted at any time, a SMS message may only be transmitted between 9 AM and 9 PM.

In the exemplary embodiment, message handler 315 is similar to message transmission module 230 (shown in FIG. 2). Message handler 315 includes a message listener 310, a message generator 140, message transmitter 145. Message handler 315 is in communication with the analysis modules and the Direct Message API 255. In these embodiments, the message listener 310 receives a message to be transmitted to a participant 260. The message includes the channel, the payload, and the destination. The message generator 140 then generates the message for the appropriate channel, while the message transmitter 145 transmits the message to the participant 260 using the appropriate channel. The message transmitter 145 transmits the message over the appropriate channel, such as channel A 320, channel B 325, and channel C 330. The different channels A 320, B 325, and C 330 may include, but are not limited to, SMS text messages, emails, chat programs, direct messaging programs, automated phone calls, social media programs, provided applications, and/or any other message channel to allow for communication with the participant 260.

In some embodiments, different channels are assigned to different conversations, where a conversation is communication about a specific topic. These conversations could be occurring simultaneously or within close time periods, aka within one day. For example, channel A 320 could be used for conversations about payments, channel B 325 could be used for a conversation about a future purchase or claim, and channel C 330 could be for conversations about updating missing information. In some embodiments, multiple conversations could be occurring over SMS messages, where each of the conversations is conducted with a different source numbers.

When the participant 260 responds to a message using a specific channel, the participant's response is assigned to the corresponding conversation. Messages for conversations could be stored together within memory storage, such as a database. In the exemplary embodiment, each conversation is associated with a conversation identifier. A user can review a conversation for information, for example a representative at a call center could review a participant's conversation on an automated chat program to determine what the participant 260 is having problems with.

In some further embodiments, the message on channel A 320 may direct the participant 260 to channel C 330. In these embodiments, the message may include a link, such as a hyperlink, directing the user to a website. The participant 260 can then communicate through the website, such as through a chat function or by filling out one or more web-based forms. This allows the system 100 to pivot between channels for different communications. This can also be used to free up channel A 320 from a slow conversation to allow that channel 320 to be available for a high priority conversation.

Further Exemplary Two-Way Message Handling

Figure 4:
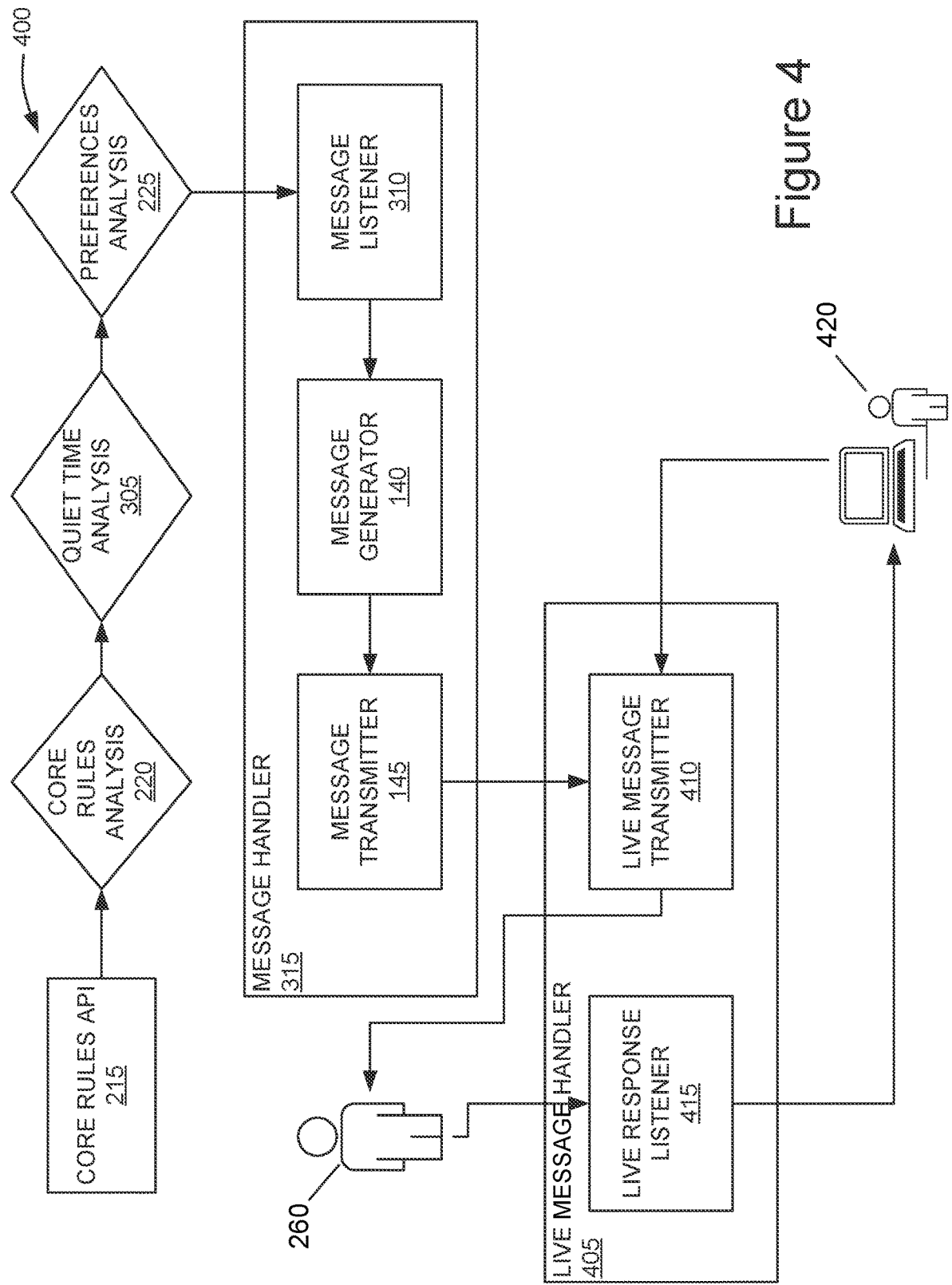
FIG. 4 illustrates a flow chart of a substitute process for two-way message handling using the system shown in FIG. 1.

FIG. 4 illustrates a flow chart of a substitute process 400 for two-way message handling using the system 100 (shown in FIG. 1). In the exemplary embodiment, process 400 is performed by the intelligent message router 105 (shown in FIG. 1).

In process 400, the messages are to be handled and responded to in real-time by both the participant 260 and a representative 420. The message transmitter 145 transmits the message to a live message transmitter 410 which is a part of a live message handler 405. The live message transmitter 410 transmits the message to the participant 260. The participant 260 then provides a response, which is received by a live response listener 415. The live response listener 415 routes the response to the representative 420 via their computer device. The representative 420 can then generate a follow-up message to the participant 260. The representative's message is routed to the live message transmitter 410, which forwards the message to the participant 260 along the same channel as the original message. The live message handler 405 routes messages between the participant 260 and the representative 420. In some embodiments, the representative 420 is considered the response processor 250 (shown in FIG. 2). In other embodiments, the representative is in communication with the response processor 250.

Exemplary Channel Locking

Figure 5:
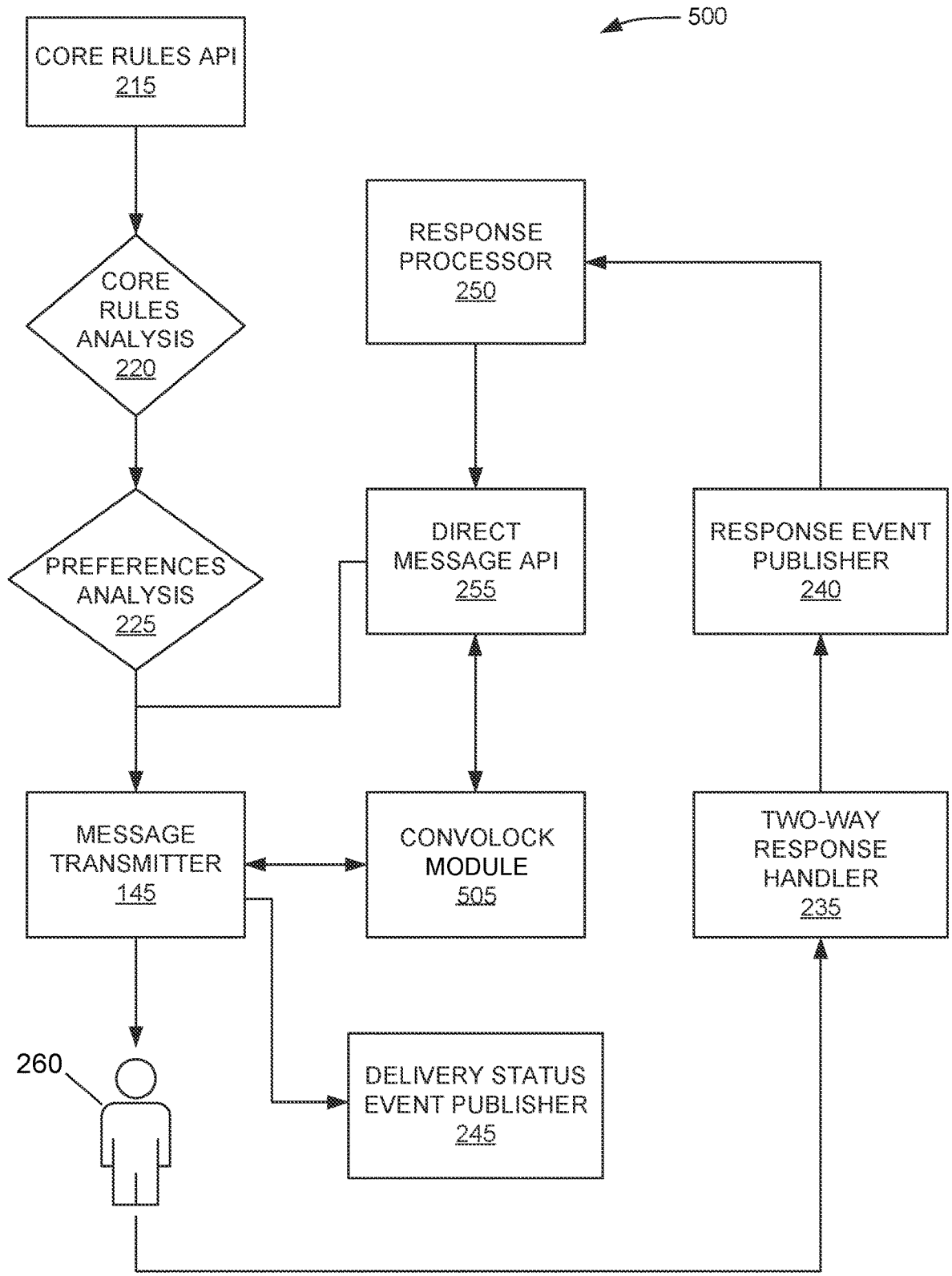
FIG. 5 illustrates a flow chart of a process for a first approach to two-way message handling with a conversation lock using the system shown in FIG. 1.

FIG. 5 illustrates a flow chart of a process 500 for a first approach to two-way message handling with a conversation lock using the system 100 (shown in FIG. 1). In this first approach, a reply is requested from the participant 260 and no lock is initially in place on the channel, such as channel A 320 (shown in FIG. 3). For the purposes of this situation, the message being routed to the participant 260 is the first message of a conversation, such as conversation A.

In the exemplary embodiment, the core rules API 215 receives a message for the participant 260, where the message requires a response from the participant 260. For example, the message could be whether or not the participant 260 wants to renew their subscription. The message is analyzed by the core rules analysis module 220 and the preferences analysis module 225. After being approved by those two modules, the message is sent to the message transmitter 145. Since this message is the beginning of conversation A. The message is configured to be transmitted over channel A 320 to the participant 260.

In the exemplary embodiment, the convolock module 505 tracks conversation locks for multiple different channels and multiple different participants 260. In at least some embodiments, the convolock module 505 is in communication with one or more databases to store information about existing conversation locks. For example, a conversation B may be locked on channel B 325 while there is no conversation locked into channel A 320. Or there may be multiple conversations locked onto different channels.

The message transmitter 145 checks the convolock status of channel A 320 with a convolock module 505. If there is no lock on channel A, then the message transmitter 145 proceeds and instructs the convolock module 505 to lock channel A 320 for conversation A with the participant 260. In the exemplary embodiment, the convolock module 505 stores the current locking state of various channels 320 in communication with various participants 260. The convolock module 505 stores flags that indicate whether or not a channel 320 is locked for a specific participant 260 or end terminal. The convolock module 505 responds to queries about the current locking state of various channels 320, 325, 330. The convolock module 505 may respond with information including, but not limited, current locking state of a specific channel, currently locking state of all channels for a specific participant, current locking state and channel for a specific conversation identifier, and/or other information as requested.

While a channel 320 may be locked for a first participant, the same channel 320 could be used for communication with other participants 260. The conversation locking is based on the participant 260 and the conversation. Furthermore, a participant 260 could be locked for channel A 320 because of a conversation, but the participant 260 could still be available for new conversations on channels B 325 and C 330. In some embodiments, a participant 260 may have more than one phone number or more than one email address. In these embodiments, the convolock module 505 could have a lock on a conversation on a first phone number or first email address, but the other phone number(s) or email address(es) would still be available.

If the check of the convolock module indicates that there is no preempting lock on channel A 320, the message transmitter 145 transmits the message to the participant 260 over the selected communication channel (channel A 320) to the participant's computer device. The message transmitter 145 also transmits a notification to the delivery status event publisher 245 including whether or not the message was successfully transmitted to the participant 260.

In the exemplary embodiment, the participant 260 responds to the message over the same channel that the message was transmitted over (channel A 320), where the response is received by the two-way response handler 235. The two-way response handler 235 parses the response and provides the appropriate information to the response event publisher 240, which forwards the information to the appropriate response processor 250. The response processor 250 determines a follow-up message for the participant 260, which is transmitted to the direct message API 255 since the follow-up message is a part of an existing conversation that the participant 260 is conducting. The response processor 250 generates a conversation follow-up payload. The response processor 250 provides the conversation identifier for the follow-up message.

In some embodiments, the direct message API 255 bypasses the analysis modules 220 and 225 since the preferences and rules were already applied. The direct message API 255 can optionally include a preference check to ensure that the participant 260 has not opted out to receive messages through other systems. The participant 260 set a preference to choose to bypass preferences checks. When the system has direct consent from the participant 260 to receive that message, the system can bypass preferences checks. In one example, when a participant 260 needs to be sent an opt in confirmation message they requested before their preferences are set to yes for automated messaging. The direct message API 255 checks with the convolock module 505 to determine if the channel is locked and/or if the conversation can be continued. The direct message API 255 provides the conversation identifier of the follow-up message to the convolock module 505. If the channel is locked with the same conversation identifier, then the convolock module 505 informs the direct message API 255. Once approved, the direct message API 255 transmits the follow-up message to the message transmitter 145.

The message transmitter 145 checks with the convolock module 505 that the lock exists and that it matches the conversation identifier. If there is a match, the follow-up message is sent to the participant 260 over the channel. If this is the last message for a conversation, then the follow-up message includes an indicator that this message ends the conversation. This causes the message transmitter 145 to inform the convolock module 505 that the conversation is complete and the convolock module releases the lock on channel A 320 for the participant 260.

In some embodiments, where the message transmitter 145 determines that the message cannot be transmitted at this time, such as due to an active convolock on the desired channel 320, the response event publisher 240 reports that failure to the event source and/or the response processor 250 to determine how to proceed. In some embodiments, the message may include information that allows the message transmitter 145 to know what to do with the message if the channel 320 and endpoint for that participant 260 are locked. The message transmitter 145 may then hold the message to be transmitted at a later date or drop the message and report the failure to the response processor 250 via the response event publisher 240. In some further embodiments, the response processor 250 determines whether or not to attempt to try to transmit the message at a later time or to transmit the message on a different channel 320. In some further embodiments, the response processor 250 may include one or more queues of messages that are on hold due to convolocks on different channels 320 for different endpoints. In some further embodiments, the remote processor 250 and/or the message transmitter 145 can determine that the message is important enough to overrule the convolock and be transmitted over the locked channel 320 and endpoint. For example, the message could be an emergency message. The message could include a flag or other indicator that notifies the message transmitter 145 that the message is to be transmitted over any convolock on the desired channel(s) and endpoint(s). The indicator could be set by the event source 110 and/or the response processor 250.

In some embodiments, the convolocked messages could be held and stored in a queue. This queue allows for multiple messages to be queued up to be transmitted after the conversation lock on the channel 320 is released. In some embodiments, the queue of messages is managed by at least one of the message transmitter 145, the remote processor 250, the convolock module 505, and/or the convohold 605 (shown in FIG. 6). Furthermore, in some embodiment, the different messages each include an associated priority. the queue can organize the messages based on their associated priority instead of being a first in first out queue that orders the messages based on the time that the message was ingested.

In still further embodiments, instead of just storing the messages in a queue, the messages could be scheduled to be delivered at specific times instead of just when the convolock is released for the desired channel 320. In these embodiments, a message scheduler (not shown) could be executed by one or more of the message transmitter 145, the remote processor 250, the convolock module 505, and/or the convohold 605. In some of the embodiments, the message scheduler could be a simple scheduler, where the messages are scheduler to be transmitted in the next available opportunity. In other embodiments, the message scheduler is a complex scheduler, where the message scheduler could be used to make intelligent determinations as to when each message should be transmitted based on the participant context. For example, the message scheduler may know the time when the conversation will be over, such as a specific amount of time after the most recent message in the conversation.

For example, certain messages may only be able to be transmitted during certain hours. Rather than just transmitting those messages at the end of the convolock, the message scheduler may determine to instead transmit the messages the next day or next available window. Furthermore, the message scheduler may use the associated priorities to order those messages within their determined windows. The message scheduler may determine whether or not to schedule gaps of time between the messages to allow the participant 260 to respond.

Exemplary Channel Locking and Unlocking

Figure 6:
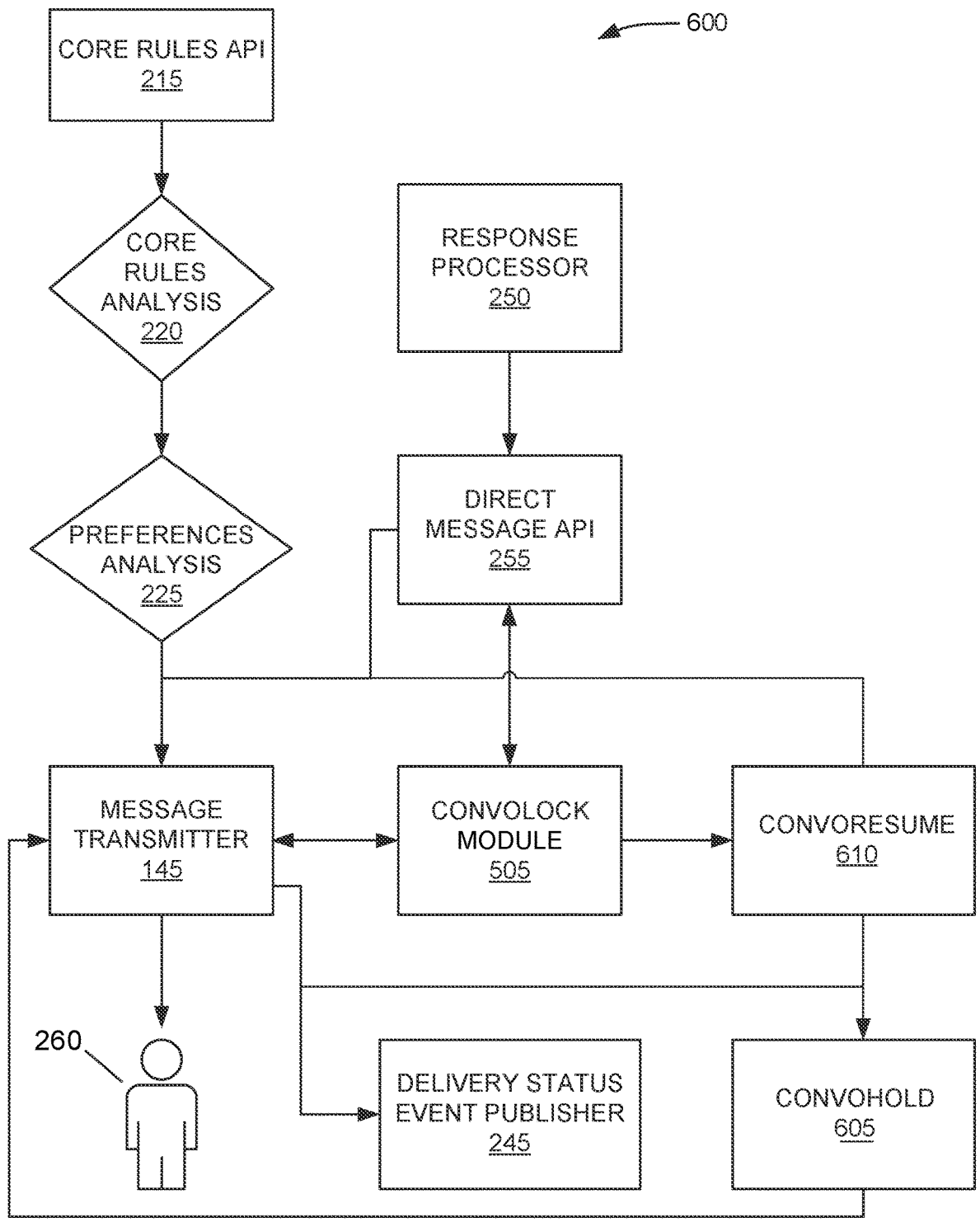
FIG. 6 illustrates a flow chart of a process for a second approach to two-way message handling with a conversation lock using the system shown in FIG. 1.

FIG. 6 illustrates a flow chart of a process 600 for a second approach to two-way message handling with a conversation lock using the system 100 (shown in FIG. 1). In this second approach, a lock is currently in place, where conversation B is currently locking channel B 325.

In the exemplary embodiment, the core rules API 215 receives a first message associated with conversation A for the participant 260 to be transmitted over channel B 325. The message is analyzed by the core rules analysis module 220 and the preferences analysis module 225. After being approved by those two modules, the message is sent to the message transmitter 145. The message transmitter 145 checks with the convolock module 505 to determine if channel B 325 is locked for the participant 260. The convolock module 505 returns that channel B 325 is currently locked. In some embodiments, the message transmitter 145 transmits the conversation identifier associated with the first message to the convolock module 505 to determine if the first message is a part of the conversation that is currently locking channel B 325. In these embodiments, the convolock module 505 can provide an approved or not approved response. In other embodiments, the convolock module 505 provides the message transmitter 145 with the conversation identifier of the conversation that is locking channel B 325.

If channel B 325 is locked with a conversation identifier that is different than that of the first message, the message transmitter 145 transmits the first message to a convohold module 605. In the exemplary embodiment, the convohold module 605 is a temporary queue for messages that cannot currently be transmitted due to a lock on the appropriate channel. The first message is stored in the convohold module 605 along with an expiration date/window. The expiration date/window informs the convohold module 605 how long to store the first message. Once the expiration date/window is reach, the convohold module 605 can delete the first message. In some embodiments, the convohold module 605 also receives a wait token to show that the convohold module 605 has messages that are on hold.

When the first message is sent to the convohold module 605, a status is sent to the delivery status event publisher 245 stating that the first message is being held due to a lock.

At a subsequent point, a final message for conversation B is sent from the response processor 250 to the direct message API 255. Before this point, multiple messages for conversation B may have been transmitted to the participant 260 over channel B 325, while the first message is stored in the convohold module 605. The final message for conversation B includes the conversation identifier and an indicator that this is the final message for conversation B. The direct message API 255 checks the convolock module 505 to ensure that channel B 325 is still locked for conversation B. The final message is transmitted to the message transmitter 145. The message transmitter 145 transmits the final message to the participant 260 over channel B 325.

The direct message API 255 can optionally include a preference check to ensure that the participant 260 has not opted out to receive messages through other systems. The participant 260 set a preference to choose to bypass preferences checks. When the system has direct consent from the participant 260 to receive that message, the system can bypass preferences checks. In one example, when a participant 260 needs to be sent an opt in confirmation message they requested before their preferences are set to yes for automated messaging.

The message transmitter 145 transmits a lock release message for channel B 325 to the convolock module 505. In response to the lock release message, the convolock module 505 releases the lock on channel B 325 for conversation B. The convolock module 505 also transmits a lock release message to a convoresume module 610. The convoresume module 610 instructs the convohold module 605 to release the top message in the queue. The convohold module 605 transmits the first message (which is the top message in the queue) to the message transmitter 145. The message transmitter 145 checks with the convolock 505 to determine if there is a lock on channel B 325. Since there is not, then the first message is sent to the participant 260 over channel B 325. Since the first message is the start of conversation A, the message transmitter 145 informs the convolock module 505 and the convolock module 505 locks channel B for conversation A.

In some embodiments, the convohold module 605 may attempt to have the second topmost message transmitted. However, since channel B 325 is now locked for conversation A, the second topmost message stays in the convohold module 605.

In some further embodiments, when message transmitter 145 determines that channel B 325 is locked, the message transmitter 145 attempts to transmit the first message over a different channel. The message transmitter 145 can check with the convolock module 505 to determine if channel A 320 or channel C 330 is currently available. If one of those is available and appropriate, the first message could be transmitted over the available channel. In some embodiments, the core rules analysis module 220 and/or the preferences analysis module 225 can inform the message transmitter 145 which channels are acceptable for transmitting the first message. The core rules analysis module 220 and/or the preferences analysis module 225 can also inform the message transmitter 145 of an order of priority of acceptable channels.

Additional Exemplary Channel Locking and Unlocking

Figure 7:
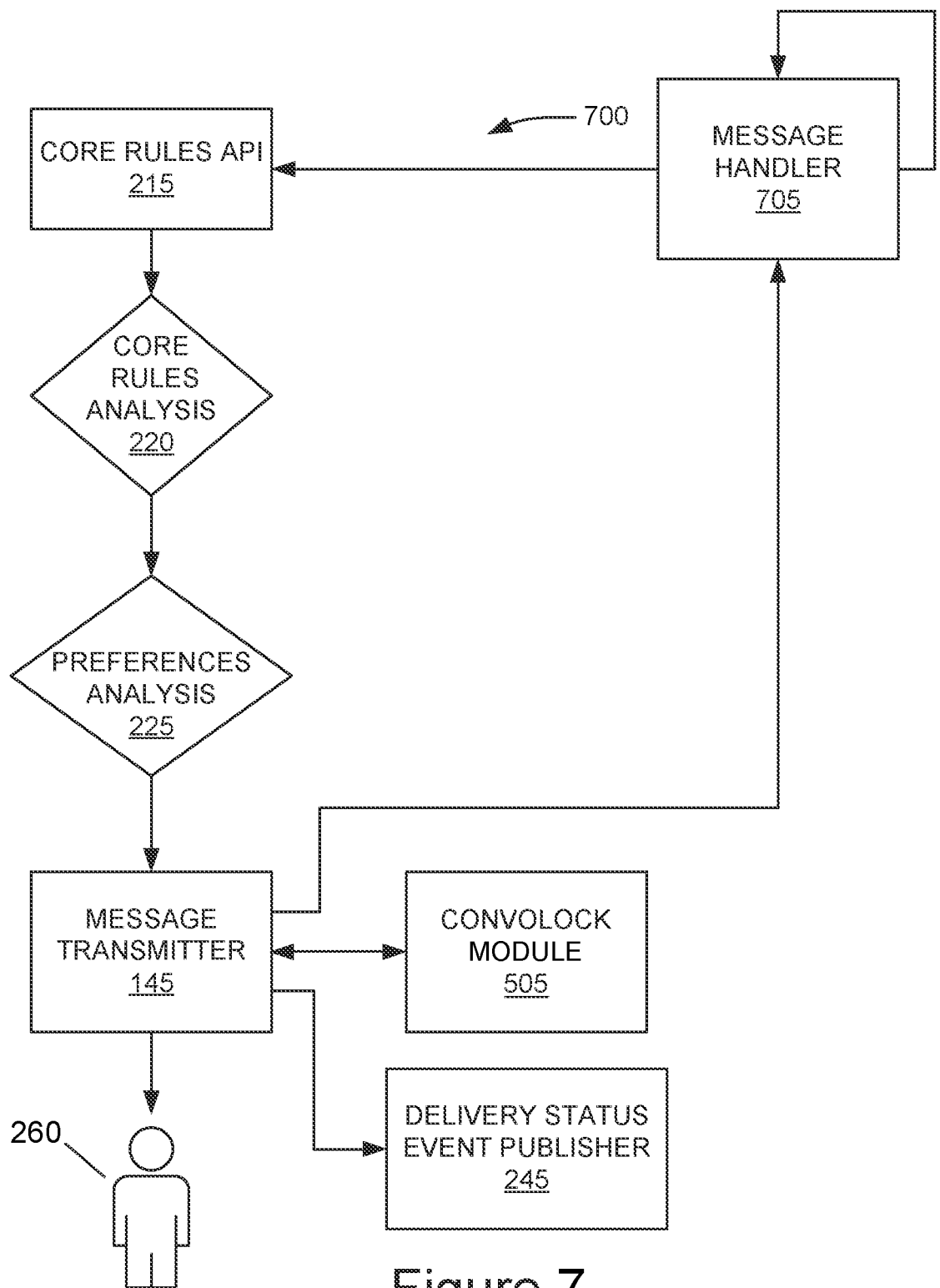
FIG. 7 illustrates a flow chart of a process for a third approach to two-way message handling with a conversation lock using the system shown in FIG. 1.

FIG. 7 illustrates a flow chart of a process 700 for a third approach to two-way message handling with a conversation lock using the system 100 (shown in FIG. 1). In this third approach, a lock is currently in place, where conversation B is currently locking channel B 325.

In the exemplary embodiment, the core rules API 215 receives a first message associated with conversation A for the participant 260 to be transmitted over channel B 325. The message is analyzed by the core rules analysis module 220 and the preferences analysis module 225. After being approved by those two modules, the message is sent to the message transmitter 145. The message transmitter 145 checks with the convolock module 505 to determine if channel B 325 is locked. The convolock module 505 returns that channel B 325 is currently locked. In some embodiments, the message transmitter 145 transmits the conversation identifier associated with the first message to the convolock module 505 to determine if the first message is a part of the conversation that is currently locking channel B 325. In these embodiments, the convolock module 505 can provide an approved or not approved response. In other embodiments, the convolock module 505 provides the message transmitter 145 with the conversation identifier of the conversation that is locking channel B 325.

If channel B 325 is locked by a conversation identifier that is different than that of the first message, the message transmitter 145 transmits a status to the delivery status event publisher 245 stating that the first message is being held due to a lock. The first message is then sent to a message handler 705. The first message may be sent to the message handler 705 by the delivery status event publisher 245 and/or the message transmitter 145. The message handler 705 holds the first message for a period of time. This period of time is a waiting period to delay while conversation B continues and potentially completes.

When the period of time expires, the message handler 705 transmits the first message to the core rules API 215, which then causes the first message to process through the core rules analysis module 220 and the preferences analysis module 225 again. When the first message reaches the message transmitter 145, the message transmitter 145 checks with the convolock 505 to determine if channel B 325 is now available or unlocked. If the channel is available, the message transmitter 145 transmits the first message to the participant 260 over channel B 325. If the channel is still locked, either from conversation B or another conversation, the message transmitter 145 retransmits the first message to the message handler 705 to wait for an additional period of time.

In some embodiments, the first message has an expiration time, after which the first message is dropped and not retransmitted to the core rules API 215 by the message handler 705.

Further Exemplary Channel Locking and Unlocking

Figure 8:
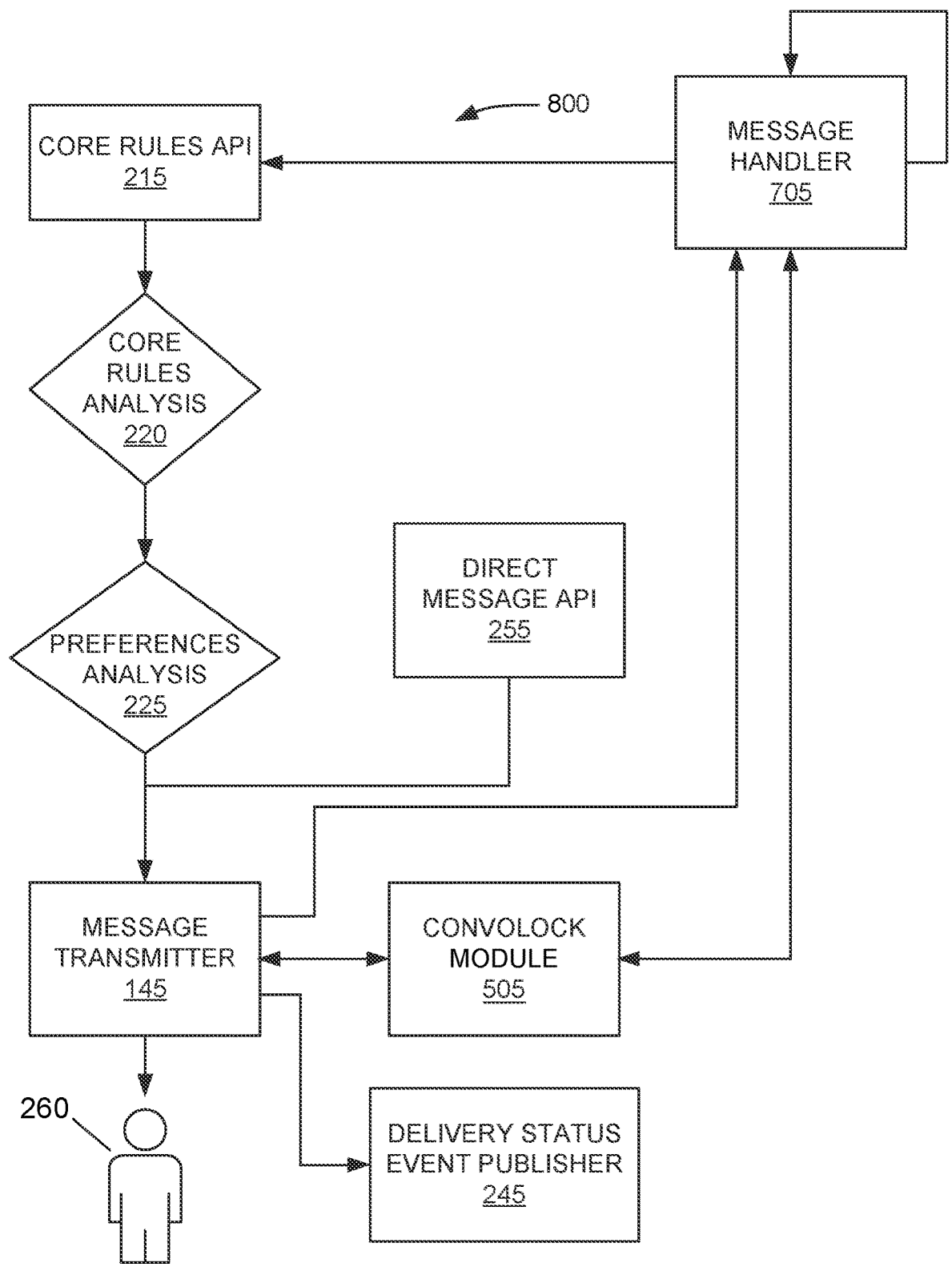
FIG. 8 illustrates a flow chart of a process for a fourth approach to two-way message handling with a conversation lock using the system shown in FIG. 1.

FIG. 8 illustrates a flow chart of a process 800 for a fourth approach to two-way message handling with a conversation lock using the system 100 (shown in FIG. 1). In this fourth approach, a lock is currently in place, where conversation B is currently locking channel B 325.

In the exemplary embodiment, the core rules API 215 receives a first message associated with conversation A for the participant 260 to be transmitted over channel B 325. The message is analyzed by the core rules analysis module 220 and the preferences analysis module 225. After being approved by those two modules, the message is sent to the message transmitter 145. The message transmitter 145 checks with the convolock module 505 to determine if channel B 325 is locked. The convolock module 505 returns that channel B 325 is currently locked. In some embodiments, the message transmitter 145 transmits the conversation identifier associated with the first message to the convolock module 505 to determine if the first message is a part of the conversation that is currently locking channel B 325. In these embodiments, the convolock module 505 can provide an approved or not approved response. In other embodiments, the convolock module 505 provides the message transmitter 145 with the conversation identifier of the conversation that is locking channel B 325.

If channel B 325 is locked with a conversation identifier that is different than that of the first message, the message transmitter 145 transmits a status to the delivery status event publisher 245 stating that the first message is being held due to a lock. The first message is then sent to a message handler 705. The first message may be sent to the message handler 705 by the delivery status event publisher 245 and/or the message transmitter 145. The message handler 705 holds the first message for a period of time. This period of time is a waiting period to delay while conversation B continues and potentially completes.

At a subsequent point, a final message for conversation B is sent to the direct message API 255. The direct message API 255 can optionally include a preference check to ensure that the participant 260 has not opted out to receive messages through other systems. The participant 260 set a preference to choose to bypass preferences checks. When the system has direct consent from the participant 260 to receive that message, the system can bypass preferences checks. In one example, when a participant 260 needs to be sent an opt in confirmation message they requested before their preferences are set to yes for automated messaging.

Before this subsequent point, multiple messages for conversation B may have been transmitted to the participant 260 over channel B 325, while the first message is being delayed by the message handler 705. The final message for conversation B includes the conversation identifier and an indicator that this is the final message for conversation B. The direct message API 255 checks the convolock module 505 to ensure that channel B 325 is still locked for conversation B. The final message is transmitted to the message transmitter 145. The message transmitter 145 transmits the final message to the participant 260 over channel B 325.

The message transmitter 145 transmits a lock release message for channel B 325 to the convolock module 505. In response to the lock release message, the convolock module 505 releases the lock on channel B 325 for conversation B. The convolock module 505 also transmits a lock release message to the message handler 705. The lock release message may be sent to the message handler 705 by the delivery status event publisher 245 and/or the convolock module 505.

When the period of time expires or a lock release message is received, the message handler 705 transmits the first message to the core rules API 215, which then causes the first message to process through the core rules analysis module 220 and the preferences analysis module 225 again. When the first message reaches the message transmitter 145, the message transmitter 145 checks with the convolock 505 to determine if channel B 325 is now available or unlocked. If the channel is available, the message transmitter 145 transmits the first message to the participant 260 over channel B 325. If the channel is locked, such as from another conversation, the message transmitter 145 retransmits the first message to the message handler 705 to wait for an additional period of time.

Exemplary Computer System

Figure 9:
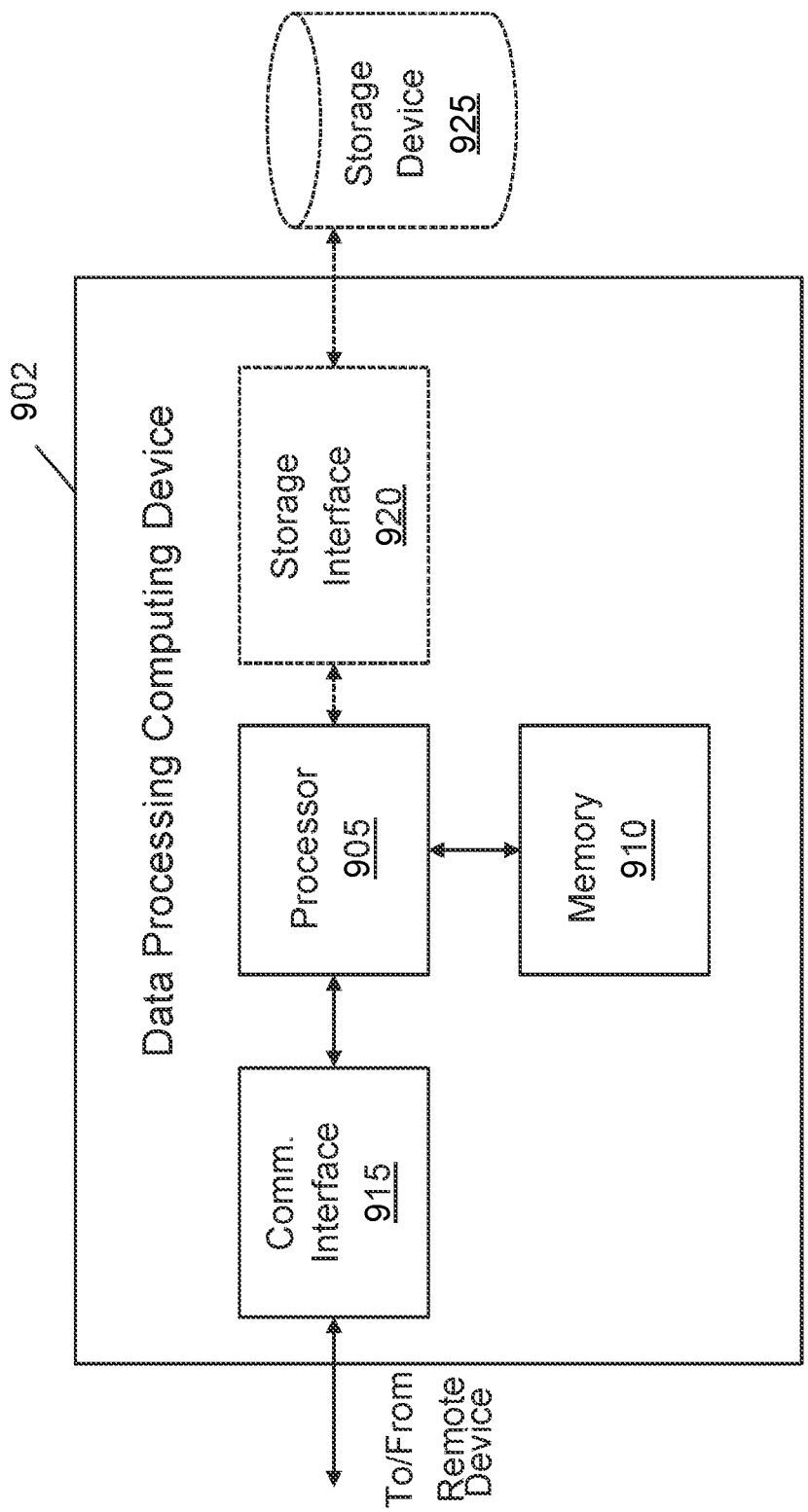
FIG. 9 illustrates a block diagram of an embodiment of a computer system or cloud server in which the present invention may be implemented.

FIG. 9 illustrates a block diagram of an embodiment of a computer system or cloud server in which the present invention may be implemented.

It should be appreciated that FIG. 9 provides only an illustration of one implementation and does not imply any limitations with regards to the environments in which different embodiments may be implemented. Many modifications to the depicted environments may be made based on design and implementation requirements.

Exemplary data processing system 900 is representative of any electronic device capable of executing machine-readable program instructions. Data processing system 900 may be representative of a smart phone, a computer system, PDA, or other electronic devices. Examples of computing systems, environments, and/or configurations that may be represented by data processing system 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Accordingly, data processing system 900 may include a processor 905 for executing instructions. Instructions may be stored in a memory area 910. Processor 905 may include one or more processing units (e.g., in a multi-core configuration).

Processor 905 may be operatively coupled to a communication interface 915 such that data processing system 900 is capable of communicating with a remote computing device. For example, data processing system 900 may receive messages and/or events from outside systems, such as through the event receiver 115 and/or event source 110 (both shown in FIG. 1) via the Internet and/or over a computer network.

Processor 905 may also be operatively coupled to a storage device 925 (e.g., participant information database 120, payload information database 125, core rules database 130, and participant rules database 135, all shown in FIG. 1). Storage device 925 may be any computer-operated hardware suitable for storing and/or retrieving data. In some embodiments, storage device 925 may be integrated in data processing system 900. For example, data processing system 900 may include one or more hard disk drives as storage device 925. In other embodiments, storage device 925 may be external to data processing system 900 and may be accessed by a plurality of data processing systems 900. For example, storage device 925 may include a storage area network (SAN), a network attached storage (NAS) system, and/or multiple storage units such as hard disks and/or solid-state disks in a redundant array of inexpensive disks (RAID) configuration.

In some embodiments, processor 905 may be operatively coupled to storage device 925 via a storage interface 920. Storage interface 920 may be any component capable of providing processor 905 with access to storage device 925. Storage interface 920 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 905 with access to storage device 925.

Exemplary Computer-Implemented Method

Figure 10:
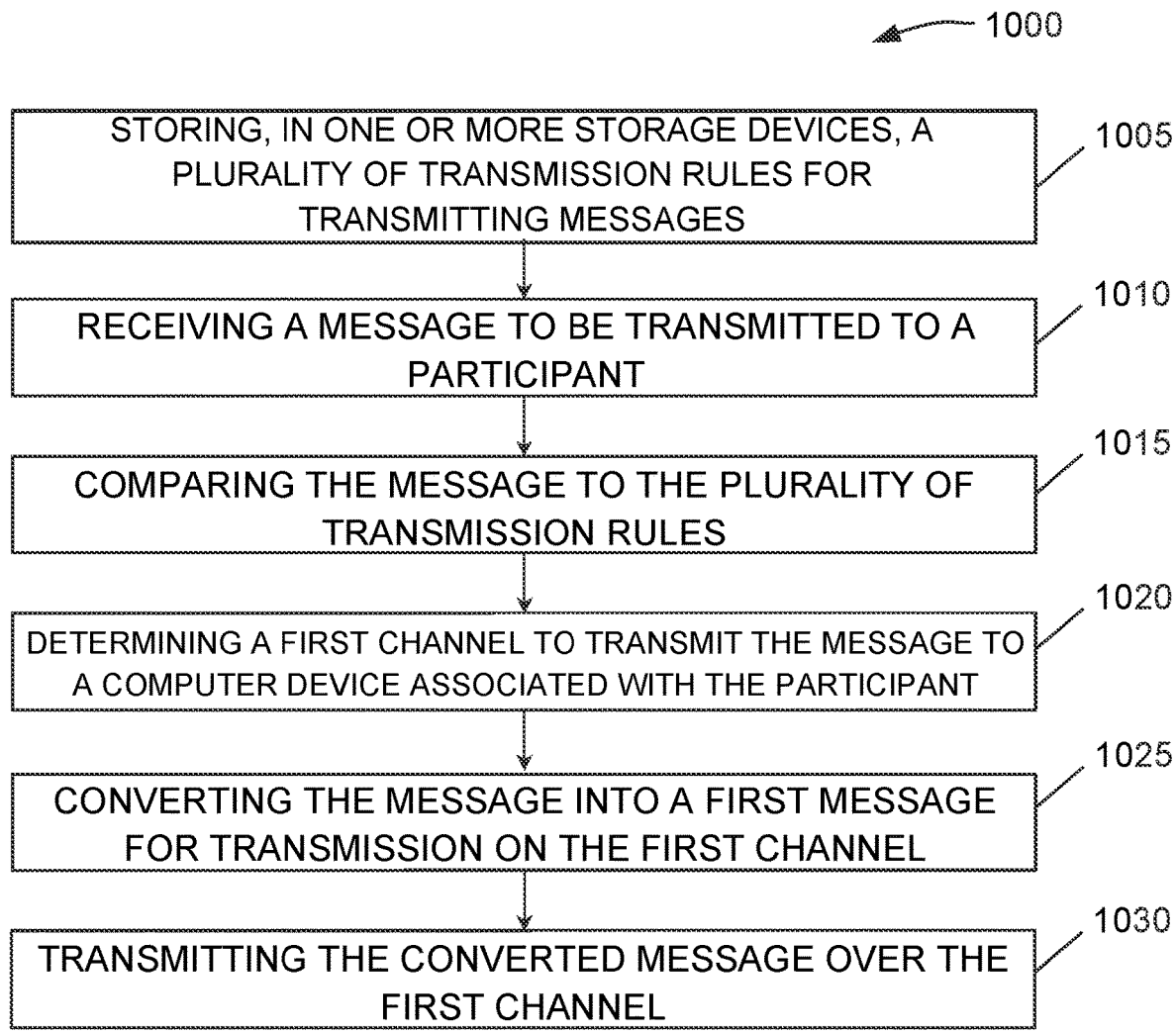
FIG. 10 illustrates a flow chart of an exemplary computer-implemented method implemented by the intelligent message routing system shown in FIG. 1.

FIG. 10 illustrates a flow chart of an exemplary computer-implemented method 1000 implemented by the intelligent message routing system 100 (shown in FIG. 1). In the exemplary embodiment, method 1000 may be implemented by an intelligent message router 105 (shown in FIG. 1).

Method 1000 may include storing 1005 a plurality of transmission rules for transmitting messages. The transmission rules may include information from, but not limited to, participant information database 120, payload information database 125, core rules database 130, participant rules database 135, (all shown in FIG. 1) and quiet time information. In some embodiments, the plurality of transmission rules are stored in one or more of the memory 910 or the storage device 925 (both shown in FIG. 9).

Method 1000 may further include receiving 1010 a message to be transmitted to a participant 260 (shown in FIG. 2). Method 1000 may also include comparing 1015 the message to the plurality of transmission rules. Step 1015 may include the core rules analysis module 220, the preferences analysis module 225 (both shown in FIG. 2), and the quiet time analysis module 305 (shown in FIG. 3).

Method 100 may also include determining 1020 a first channel 320 (shown in FIG. 3) to transmit the message to a computer device associated with the participant 260 based on the comparison. Method 1000 may additionally include converting 1025 the message into a first message for transmission on the first channel 320. Step 1025 may be performed by the message generator 140 (shown in FIG. 1).

Method 1000 may moreover include transmitting 1030 the first message over the first channel 320. Step 1030 may be performed by the message transmitter 145 (shown in FIG. 1).

In some further embodiments, the message includes a conversation identifier and message identifier. The conversation identifier signifies a conversation with the participant 260. The intelligent message router 105 stores the conversation identifier and message identifier prior to transmission of the first message. Subsequent to the transmission of the first message, the intelligent message router 105 receives a response from the computer device associated with the participant 260 via the first channel 320. The intelligent message router 105 associates the response from the participant 260 with the conversation identifier of the message.

In additional embodiments, the intelligent message router 105 receives a second message to be transmitted to the participant 260. However, the second message is not associated with the conversation identifier. The intelligent message router 105 determines if the conversation is complete. If the conversation is complete, the intelligent message router 105 transmits the second message via the first channel 320. If the conversation is not complete, the intelligent message router 105 transmits the second message via a second channel 325 (shown in FIG. 3). Where the second channel 325 is different than the first channel 320. In other embodiments, the intelligent message router 105 can also determine whether or not to place the second message in a queue to be transmitted when the first channel 320 becomes available.

In still further embodiments, the conversation is a first conversation, the conversation identifier is a first conversation identifier, and the second message is associated with a second conversation identifier associated with a second conversation. The intelligent message router 105 may associate the first channel 320 with the first conversation and the second channel 325 with the second conversation. The intelligent message router 105 receives a third message not associated with the first conversation or the second conversation. The intelligent message router 105 stores the third message until an appropriate channel is no longer associated with a conversation. The intelligent message router 105 may store the third message in a convohold module 605 (shown in FIG. 6). The intelligent message router 105 may also route the third message to a message handler 705 (shown in FIG. 7) to attempt to transmit the third message after a period of time.

In other embodiments, the intelligent message router 105 locks the first channel to the conversation. The intelligent message router 105 may receive a second message to be transmitted to the participant 260. The second message is associated with the conversation identifier. Then the intelligent message router 105 transmits the second message to the participant 260 via the first channel 320. The second message may end the conversation. The intelligent message router 105 unlocks the first channel 320 upon successful transmission of the first message.

In still further embodiments, the intelligent message router 105 may receive a response message from the participant 260 via the first channel 320. The intelligent message router 105 may determine that the response message is associated with the conversation. The intelligent message router 105 may determine that the response message ends the conversation. Then the intelligent message router 105 may unlock the first channel 320 in response to the determination that the response message ends the conversation.

In additional embodiments, the plurality of transmission rules include a plurality of core rules. In these embodiments, the intelligent message router 105 determines whether or not to transmit the message based on the plurality of core rules. In some embodiments, the plurality of transmission rules include a plurality of participant preferences associated with the participant 260. In these embodiments, the intelligent message router 105 determines how to transmit the message based on the plurality of participant preferences. In other embodiments, the plurality of transmission rules include a quiet time period. In these embodiments, the intelligent message router 105 determines whether or not the message can be transmitted based on the quiet time period. The intelligent message router 105 may delay transmission of the message until after the quiet time period.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

ADDITIONAL CONSIDERATIONS

Described herein are computer systems such as the intelligent message routing computer devices and related computer systems. As described herein, all such computer systems include a processor and a memory. However, any processor in a computer device referred to herein can also refer to one or more processors wherein the processor can be in one computing device or a plurality of computing devices acting in parallel. Additionally, any memory in a computer device referred to herein can also refer to one or more memories wherein the memories can be in one computing device or a plurality of computing devices acting in parallel.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor can include any programmable system including systems using micro-controllers, reduced instruction set circuits (RISC), application-specific integrated circuits (ASICs), logic circuits, and any other circuit or processor capable of executing the functions described herein. The above examples are example only and are thus not intended to limit in any way the definition and/or meaning of the term "processor."

As used herein, the term "database" can refer to either a body of data, a relational database management system (RDBMS), or to both. As used herein, a database can include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In another example, a computer program is provided, and the program is embodied on a computer-readable medium. In an example, the system is executed on a single computer system, without requiring a connection to a server computer. In a further example, the system is being run in a Windows® environment (Windows is a registered trademark of Microsoft Corporation, Redmond, Wash.). In yet another example, the system is run on a mainframe environment and a UNIX® server environment (UNIX is a registered trademark of X/Open Company Limited located in Reading, Berkshire, United Kingdom). In a further example, the system is run on an iOS® environment (iOS is a registered trademark of Cisco Systems, Inc. located in San Jose, Calif.). In yet a further example, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some examples, the system includes multiple components distributed among a plurality of computer devices. One or more components can be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present examples can enhance the functionality and functioning of computers and/or computer systems.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional embodiments that also incorporate the recited features.

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

The systems and processes are not limited to the specific examples described herein. In addition, components of each system and each process can be practiced independent and separate from other components and processes described herein. Each component and process also can be used in combination with other assembly packages and processes.

The patent claims at the end of this document are not intended to be construed under 35 U.S.C. § 112(f) unless traditional means-plus-function language is expressly recited, such as "means for" or "step for" language being expressly recited in the claim(s).

The computer-implemented methods discussed herein can include additional, less, or alternate actions, including those discussed elsewhere herein. The methods can be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein can include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein can be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An intelligent message routing system comprising:
one or more processors, one or more computer readable storage devices, and a plurality of program instructions stored on at least one of the one or more storage devices for execution by at least one of the one or more processors, when executed by the one or more processors, the plurality of program instructions cause the one or more processors to:
store a plurality of transmission rules for transmitting messages;
receive a message to be transmitted to a participant, wherein the message includes a conversation identifier and message identifier, wherein the conversation identifier signifies a conversation with the participant;
compare the message to the plurality of transmission rules;
determine a first channel to transmit the message to a computer device associated with the participant based on the comparison;
convert the message into a first message for transmission on the first channel;
store the conversation identifier and message identifier prior to transmission of the first message;
transmit the first message over the first channel;

subsequent to the transmission of the first message, receive a response from the computer device associated with the participant via the first channel; and
associate the response from the participant with the conversation identifier of the message.

2. The system of claim 1, wherein the plurality of program instructions further cause the one or more processors to:
receive a second message to be transmitted to the participant, wherein the second message is not associated with the conversation identifier;
determine if the conversation is complete;
if the conversation is complete, transmit the second message via the first channel; and
if the conversation is not complete, transmit the second message via a second channel, wherein the second channel is different than the first channel.

3. The system of claim 2, wherein the conversation is a first conversation, wherein the conversation identifier is a first conversation identifier, wherein the second message is associated with a second conversation identifier associated with a second conversation, and wherein the plurality of program instructions further cause the one or more processors to:
associate the first channel with the first conversation and the second channel with the second conversation; and
receive a third message not associated with the first conversation or the second conversation.

4. The system of claim 3, wherein the plurality of program instructions further cause the one or more processors to store the third message until an appropriate channel is no longer associated with a conversation.

5. The system of claim 3, wherein the plurality of program instructions further cause the one or more processors to route the third message to a message handler to attempt to transmit the third message after a period of time.

6. The system of claim 1, wherein the plurality of program instructions further cause the one or more processors to lock the first channel to the conversation.

7. The system of claim 6, wherein the plurality of program instructions further cause the one or more processors to:
receive a second message to be transmitted to the participant, wherein the second message is associated with the conversation identifier; and
transmit the second message to the participant via the first channel.

8. The system of claim 7, wherein the second message ends the conversation, and wherein the plurality of program instructions further cause the one or more processors to unlock the first channel upon successful transmission of the first message.

9. The system of claim 6, wherein the plurality of program instructions further cause the one or more processors to:
receive a response message from the participant via the first channel;
determine that the response message is associated with the conversation;
determine that the response message ends the conversation; and
unlock the first channel in response to the determination that the response message ends the conversation.

10. The system of claim 1, wherein the plurality of program instructions further cause the one or more processors to:
determine a first channel and a second channel to transmit the message to one or more computer devices associated with the participant based on the comparison;
convert the message into the first message for transmission on the first channel; and
transmit the first message over the first channel;
convert the message into a second message for transmission on the second channel different from the first channel; and
transmit the second message over the second channel.

11. The system of claim 1, wherein the plurality of transmission rules include a plurality of core rules, and wherein the plurality of program instructions further cause the one or more processors to determine whether or not to transmit the message based on the plurality of core rules.

12. The system of claim 1, wherein the plurality of transmission rules include a plurality of participant preferences associated with the participant, and wherein the plurality of program instructions further cause the one or more processors to determine how to transmit the message based on the plurality of participant preferences.

13. The system of claim 1, wherein the plurality of transmission rules include a quiet time period, and wherein the plurality of program instructions further cause the one or more processors to determine whether or not the message can be transmitted based on the quiet time period.

14. The system of claim 13, wherein the plurality of program instructions further cause the one or more processors to delay transmission of the message until after the quiet time period.

15. A computer implemented method for intelligent message routing implemented using at least one processor, the method comprising:
storing, in one or more storage devices, a plurality of transmission rules for transmitting messages;
receiving a message to be transmitted to a participant, wherein the message includes a conversation identifier and message identifier, wherein the conversation identifier signifies a conversation with the participant;
comparing the message to the plurality of transmission rules;
determining a first channel to transmit the message to a computer device associated with the participant based on the comparison;
converting the message into a first message for transmission on the first channel;
storing the conversation identifier and message identifier prior to transmission of the first message;
transmitting the first message over the first channel;
subsequent to the transmission of the first message, receiving a response from the computer device associated with the participant via the first channel; and
associating the response from the participant with the conversation identifier of the message.

16. The method of claim 15 further comprising:
receiving a second message to be transmitted to the participant, wherein the second message is not associated with the conversation identifier;
determining if the conversation is complete;
if the conversation is complete, transmitting the second message via the first channel; and
if the conversation is not complete, transmitting the second message via a second channel, wherein the second channel is different than the first channel.

17. The method of claim 16, wherein the conversation is a first conversation, wherein the conversation identifier is a first conversation identifier, wherein the second message is associated with a second conversation identifier associated with a second conversation, and wherein the method further comprises:

associating the first channel with the first conversation and the second channel with the second conversation;

receiving a third message not associated with the first conversation or the second conversation; and storing the third message until an appropriate channel is no longer associated with a conversation.

18. The method of claim 15 further comprising:

locking the first channel to the conversation;

receiving a second message to be transmitted to the participant, wherein the second message is associated with the conversation identifier, and wherein the second message ends the conversation;

transmitting the second message to the participant via the first channel; and unlocking the first channel upon successful transmission of the first message.

19. The method of claim 18 further comprising:

receiving a response message from the participant via the first channel;

determining that the response message is associated with the conversation;

determining that the response message ends the conversation; and unlocking the first channel in response to the determination that the response message ends the conversation.

20. The method of claim 15 further comprising:

determining a first channel and a second channel to transmit the message to one or more computer devices associated with the participant based on the comparison;

converting the message into the first message for transmission on the first channel; and transmitting the first message over the first channel;

converting the message into a second message for transmission on the second channel different from the first channel; and transmitting the second message over the second channel.

* * * * *